(12) United States Patent
Wood, Sr. et al.

(10) Patent No.: US 11,837,908 B2
(45) Date of Patent: Dec. 5, 2023

(54) SUPER CAPACITOR BASED POWER SYSTEM FOR DELIVERY VEHICLE

(71) Applicant: Systematic Power Manufacturing, LLC, Knoxville, TN (US)

(72) Inventors: Robert J. Wood, Sr., Oneonta, NY (US); Chad E. Hall, Oneonta, NY (US)

(73) Assignee: Systematic Power Manufacturing, LLC, Knoxville, TN (US)

( * ) Notice: Subject to any disclaimer, the term of this patent is extended or adjusted under 35 U.S.C. 154(b) by 37 days.

(21) Appl. No.: 17/690,784

(22) Filed: Mar. 9, 2022

(65) Prior Publication Data

US 2022/0399742 A1  Dec. 15, 2022

Related U.S. Application Data

(60) Provisional application No. 63/209,861, filed on Jun. 11, 2021, provisional application No. 63/279,525, filed on Nov. 15, 2021.

(51) Int. Cl.
*H02J 7/34* (2006.01)
*H02J 7/00* (2006.01)
(Continued)

(52) U.S. Cl.
CPC ............ *H02J 7/345* (2013.01); *B60P 1/4471* (2013.01); *B60R 16/033* (2013.01); *F02N 11/087* (2013.01); *F02N 11/0866* (2013.01); *H02J 7/0013* (2013.01); *H02J 7/0063* (2013.01); *H02J 7/342* (2020.01); *F02N 2011/0885* (2013.01)

(58) Field of Classification Search
CPC ........ B60R 16/033; B60P 1/4471; H02J 7/14; H02J 7/342; H02J 7/345; H02J 2207/20; H02J 2310/46; Y02T 10/70
See application file for complete search history.

(56) References Cited

U.S. PATENT DOCUMENTS 5,710,699 A  1/1998  King et al.
6,476,586 B2  11/2002  Yunosawa et al.
(Continued)

OTHER PUBLICATIONS

Transmittal, International Search Report and Written Opinion dated Sep. 22, 2022 in related PCT/US22/33083; 16 pages.

*Primary Examiner* — Lincoln D Donovan
*Assistant Examiner* — Alex W Lam
(74) *Attorney, Agent, or Firm* — Peter L. Brewer; Thrive IP

(57) ABSTRACT

An electrical power system for a delivery vehicle. The power system is used in connection with a vehicle having an engine, and a liftgate powered by an electric motor. The power system includes a first battery, a second battery, and an alternator. The electrical power system also includes a super capacitor. The super capacitor has a first capacitor bank and a second capacitor bank, wherein each of the first and second capacitor banks comprises ultra-capacitor cells placed in series. The first and second capacitor banks reside in parallel. In addition, the first and second batteries reside in parallel with the second capacitor bank. Together, the batteries and the second capacitor bank supply power to the liftgate motor. Finally, the first capacitor bank is in electrical communication with the alternator and supplies power, with the alternator, to a relay start for the delivery vehicle to start the engine.

34 Claims, 13 Drawing Sheets

(51) Int. Cl.
    *B60R 16/033*    (2006.01)
    *B60P 1/44*    (2006.01)
    *F02N 11/08*    (2006.01)

(56) References Cited

U.S. PATENT DOCUMENTS

| | | |
|---|---|---|
| 6,518,733 B1 | 2/2003 | Schenkel et al. |
| 6,799,070 B2 | 9/2004 | Wolfe et al. |
| 7,077,209 B2 | 7/2006 | McCulloch et al. |
| 7,633,271 B2 | 12/2009 | Schulte et al. |
| 8,519,821 B2 | 8/2013 | Ablabutyan |
| 8,655,574 B2 | 2/2014 | Izumoto et al. |
| 8,751,116 B2 | 6/2014 | Bark et al. |
| 8,798,871 B2 | 8/2014 | Lugash et al. |
| 8,886,425 B2 | 11/2014 | Doering et al. |
| 9,616,796 B2 * | 4/2017 | Russo ................ B60P 1/4485 |
| 9,892,868 B2 | 2/2018 | Pyzza et al. |
| 9,899,643 B2 | 2/2018 | Pyzza et al. |
| 10,065,523 B2 | 9/2018 | Wood et al. |
| 10,242,808 B2 | 3/2019 | Eilertsen et al. |
| 10,596,913 B2 | 3/2020 | Healy et al. |
| 10,654,369 B2 | 5/2020 | Healy |
| 10,668,825 B2 | 6/2020 | Wood et al. |
| 10,668,831 B2 | 6/2020 | Hudson |
| 10,688,903 B2 | 6/2020 | Marji et al. |
| 10,710,525 B2 | 7/2020 | Pierce et al. |
| 10,723,182 B2 | 7/2020 | Lesesky et al. |
| 10,744,888 B2 | 8/2020 | Healy et al. |
| 10,821,853 B2 | 11/2020 | Healy et al. |
| 10,967,742 B2 | 4/2021 | Healy |
| 10,981,487 B1 | 4/2021 | Russo |
| 11,046,192 B2 | 6/2021 | Aufdencamp |
| 11,273,716 B2 | 3/2022 | Matsuda et al. |
| 11,281,982 B2 | 3/2022 | Cristache |
| 11,293,394 B2 | 4/2022 | Banerjee et al. |
| 11,303,139 B2 | 4/2022 | Hinterberger et al. |
| 11,303,980 B2 | 4/2022 | Chng et al. |
| 2003/0151875 A1 | 8/2003 | Nguyen et al. |
| 2007/0090808 A1 * | 4/2007 | McCabe ................ B60L 50/40 320/137 |
| 2007/0132313 A1 | 6/2007 | Baeuerle |
| 2009/0314561 A1 | 12/2009 | Handa |
| 2010/0097029 A1 * | 4/2010 | McCabe ................ B60L 50/40 320/103 |
| 2010/0148582 A1 | 6/2010 | Carter |
| 2012/0237799 A1 | 9/2012 | Jiang et al. |
| 2013/0031318 A1 | 1/2013 | Chen et al. |
| 2013/0264875 A1 * | 10/2013 | Kaminsky ................ H01G 9/28 307/52 |
| 2014/0041179 A1 | 2/2014 | Bradley et al. |
| 2015/0240939 A1 | 8/2015 | Ge |
| 2016/0243960 A1 | 8/2016 | Wood et al. |
| 2016/0297317 A1 | 10/2016 | Huang et al. |
| 2017/0063104 A1 | 3/2017 | Bean |
| 2018/0249517 A1 | 8/2018 | Park et al. |
| 2019/0176650 A1 | 6/2019 | Wood et al. |

* cited by examiner

SUPER CAPACITOR BASED POWER SYSTEM FOR DELIVERY VEHICLE

STATEMENT OF RELATED APPLICATIONS

This application claims the benefit of U.S. Ser. No. 63/209,861 filed Jun. 11, 2021. That application is entitled "Super Capacitor Based Power Module for Lift Gate."

This application also claims the benefit of U.S. Ser. No. 63/279,525 filed Nov. 15, 2021. That application is entitled "Super Capacitor Based Power System for Delivery Vehicle."

Each of these applications is incorporated herein in its entirety by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce selected aspects of the art, which may be associated with various embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Field of the Invention

The present disclosure relates to the field of power generation for mobile units. More specifically, the present invention relates to a hybrid super-capacitor and battery system used for supporting the operation of a lift gate associated with a truck or other delivery vehicle.

Discussion of Technology

Batteries are frequently used in cars, trucks, boats and other vehicles as a way of providing the initial charge for an internal combustion engine. The battery provides electricity needed for the starter to start the vehicle. In operation, the operator of the vehicle will activate the ignition switch (such as by pressing a button in the cab or by inserting and turning a key). The ignition switch controls a starter relay (also called a solenoid), allowing a pair of contacts to close. When the contacts close, the battery sends a voltage to the starter motor, which turns gears to start the engine for the vehicle.

The same battery is also used to provide power for electrical devices associated with the vehicle. These include headlights, air conditioning, heating, and other onboard electrical systems.

It has long been known to include an alternator on a vehicle to provide support for the battery. The alternator includes a rotor shaft that is turned by a pulley and drive belt system. When the engine is started, the pulley turns the rotor shaft, causing the rotor to act as a spinning electro-magnet. As the pulley is rotated, alternating current (AC) passes through a magnetic field and an electrical current is generated. Thus, when the car is running, the alternator generates energy to both feed the electrical system of the vehicle and to maintain charge in the battery.

The electrical energy generated by the alternator and battery together must be adequate to support the vehicle's so-called hotel load. The term "hotel load" refers to the non-driving energy demands on a vehicle. This may include energy used for lights, air conditioning, heating, geo-tracking systems, computers and safety systems. The larger the charge that is needed to start a vehicle and to assist in supporting hotel load, the larger the battery (measured in kilo-watt hours) that is required.

Some vehicles, particularly delivery trucks, include a lift gate. A life gate is an add-on feature typically used to lift loads onto and off of the truck. Specifically, the lift gate enables freight to be lifted from the ground to the height of the truck's tailgate, or from the bed of the truck down to the ground. Trash trucks also use a lift gate system, except in this instance the lift gate picks up a trash container and raises the trash container into an inverted position over a dump trailer associated with the truck.

In some cases, the lift gate is powered by an independent DC battery located at a rear of the truck and proximate the lift gate. However, in many instances the lift gate is powered by the same battery that also starts the truck, that is, it provides electricity needed for the starter to start the vehicle, it supplies electricity for the hotel load, and it supplies power for the motor that drives the lift gate.

In trucks where the DC-powered lift gate operates off of the same battery (or batteries) that are used to start the truck, there is a chance that the battery will not have enough energy to re-start the truck. This might occur, for example, if a series of lifts are performed that causes the battery to drain. The problem of battery run-down can be aggravated by temperature extremes, particularly drops in temperature. Battery run-down can also be aggravated if the truck engine is not "turned over" for a period of time, or if the truck has not had sufficient time to recharge its battery between stops.

A problem sometimes faced by operators of trucks having a lift gate occurs when the battery goes out while the lift gate is in use. In some cases, this means that the lift gate is stuck in a position that makes the truck impossible to drive. In a worst case scenario, the lift gate is supporting a physical load when the battery goes out. The operator must then request a costly service call.

To avoid these situations, the operator may add an additional battery "under the hood." However, even then it is possible that both batteries can lose charge.

Therefore, a need exists for a power system for a delivery truck or other working truck where banks of ultra-capacitors are used to augment the battery service for vehicle starting, hotel load and lift energy. A need further exists for a power module residing on a truck that uses ultra-capacitors that assist both vehicle starting and lift energy.

SUMMARY OF THE INVENTION

An electrical power system for a vehicle is provided. The vehicle is a delivery truck or other working truck. The delivery vehicle has an engine compartment and a cargo compartment. In addition, the delivery vehicle is fitted with a lift gate system. The truck may have a separate trailer, but preferably the vehicle is a so-called city delivery truck where the engine compartment, the cab and the cargo compartment all reside on a shared chassis.

The delivery truck will include an engine and an alternator. Each of the engine and the alternator is located at a front of the truck, that is, within the engine compartment. The alternator serves as a source of DC power. As noted, the delivery truck will also include a lift gate. The lift gate resides at the back of the truck, and is typically secured to the framing of the cargo compartment, or optionally a back tail gate.

The electrical power system includes a first battery, and preferably also a second battery. Preferably, each of the first battery and the second battery is a lithium-ion battery (or "LIB"). The batteries reside within the engine compartment.

The electrical power system also includes a super capacitor. The super capacitor has a first capacitor bank and a second capacitor bank, wherein each of the first capacitor bank and the second capacitor bank comprises ultra-capacitor cells placed in series. The super capacitor includes a housing that holds the first and second capacitor banks. The super capacitor also resides within the engine compartment of the delivery vehicle.

The electrical power system also includes a diode. The diode electrically resides between the first capacitor bank and the second capacitor bank, within the housing. When a voltage in the first capacitor bank is less than, or drops below, a voltage in the second capacitor bank, the first and second capacitor banks are placed in parallel communication so that the at least one battery can supply charge to the first capacitor bank, through the diode.

The first battery and the optional second battery reside in parallel with the second capacitor bank. Together, the first battery, the second battery and the second capacitor bank supply power to a motor for the lift gate. Preferably, the second capacitor bank contains enough energy to power the electric motor for the lift gate through at least two operating cycles without the batteries, protecting the lift gate if the batteries go weak.

The first capacitor bank is in electrical communication with the alternator. In this way, the first capacitor bank supplies power, along with the alternator, to a relay start for the delivery vehicle to start the engine. The first capacitor bank is able to supply power to the starter independent of the second capacitor bank. The result is that the first bank of capacitors is able to start the engine of the delivery vehicle regardless of the temporary condition of the batteries, ensuring that the truck engine can always run.

The super capacitor offers three terminals. In one aspect, the three terminals comprise a first positive terminal, a second positive terminal, and a negative terminal. The first capacitor bank is in electrical communication with and is charged by the alternator through the first positive terminal, while the second capacitor bank is in electrical communication with the liftgate motor through the second positive terminal.

The second capacitor bank is charged by either the alternator or the first and second batteries. Beneficially, the second capacitor bank is configured to support peak currents in the liftgate motor when the liftgate motor is in operation.

In one aspect, the electrical power system further comprises an integrated DC/DC boost converter. The DC/DC converter also resides within the housing of the super capacitor. The DC/DC converter has an input side in electrical communication with the first capacitor bank, and an output side in electrical communication with the second capacitor bank. The DC/DC converter allows charge to be sent from the first capacitor bank to the second capacitor bank, effectively serving as a second alternator.

A method for operating a liftgate is also provided herein. In one aspect, the method first comprises providing a delivery vehicle. The delivery vehicle will have an alternator and a combustion engine, each of which resides within an engine compartment, or "under the hood." The delivery vehicle will also have a first battery, a capacitor module, and a liftgate.

In the method, the capacitor module comprises a first capacitor bank and a second capacitor bank. Each of the first capacitor bank and the second capacitor bank comprises a series of ultra-capacitor cells. A diode connects the first capacitor bank and the second capacitor bank, serving essentially as a one-way switch.

In the method, the first battery resides in parallel with the second capacitor bank. Together, the first battery and the second capacitor bank provide power to the liftgate motor. At the same time, the first capacitor bank is in electrical communication with the alternator and supplies power, with the alternator, to a relay start for the delivery vehicle to start the combustion engine.

The method also includes sending a signal to operate the liftgate. Preferably, an electric motor is associated with the liftgate. Sending a signal to operate the liftgate comprises sending an electrical signal from the capacitor module that causes the liftgate to be raised or to be lowered. The liftgate motor may be secured onto the cargo compartment at a rear of the delivery vehicle.

In one aspect, the method further comprises operating the delivery vehicle for a period of time in order to spin the alternator. This, in turn, charges the first bank of capacitors within the capacitor module.

In a preferred arrangement, the capacitor module comprises a housing having three terminals. The first capacitor bank and the second capacitor bank reside together within the housing. The three terminals may comprise a first positive terminal, a second positive terminal, and a negative terminal. The first capacitor bank is in electrical communication with and is charged by the alternator through the first positive terminal, while the second capacitor bank is in electrical communication with the liftgate motor through the second positive terminal.

Preferably, the first capacitor bank is in electrical communication with the alternator by means of an alternator cable connecting the alternator to the first positive terminal. At the same time, the second capacitor bank is in electrical communication with the motor of the lift gate. Optionally, the second capacitor bank is further in electrical communication with the hotel load of the delivery vehicle. In either instance, the second capacitor bank is configured to support peak currents in the liftgate motor when the liftgate motor is in operation.

In a preferred embodiment, the vehicle further comprises a second battery. The second battery also resides in parallel with the second capacitor bank. The second battery also resides within the engine compartment of the delivery vehicle. When a voltage of the first capacitor bank is less than that of the second capacitor bank, power is supplied by the first battery and the second battery through the diode to the first capacitor bank.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Figure 1A:
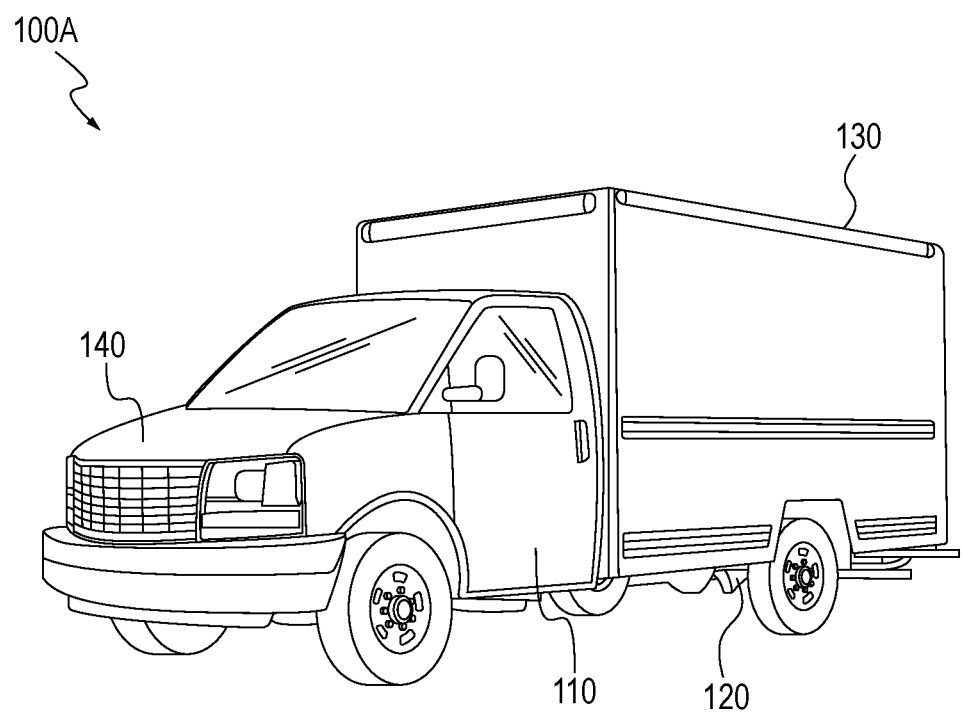
FIG. 1A is a perspective view of a city delivery truck, in one embodiment. This particular truck is a medium duty, multi-stop truck.

FIG. 1A is a perspective view of a city delivery truck 100A. This particular truck 100A is a medium duty, multi-stop delivery truck. Such trucks are commonly used for local deliveries and can be driven without a commercial driver's license in most states.

Figure 1B:
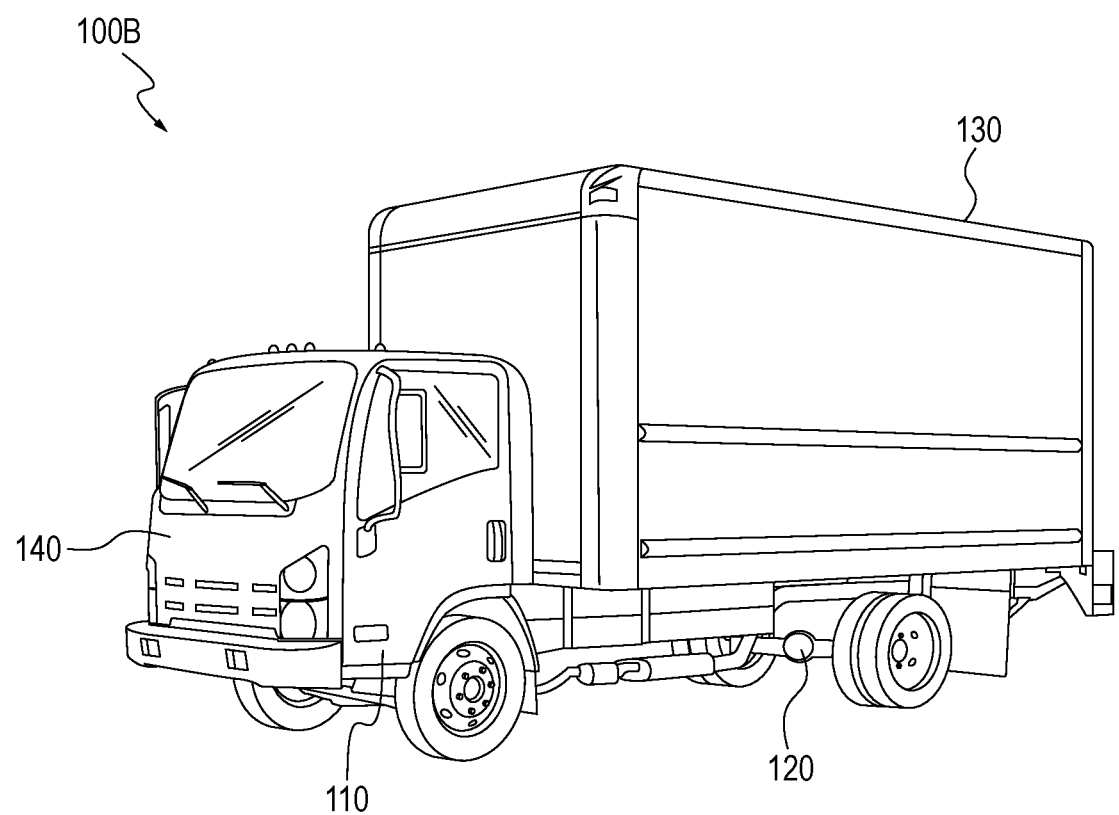
FIG. 1B is another perspective view of a city delivery truck. This particular truck is a so-called light duty box truck.

FIG. 1B is another perspective view of a city delivery truck 100B. This particular truck 100B is a so-called light duty box truck. Alternatively, this truck may be referred to as a "hi-cube" truck. Such trucks are also frequently used for local deliveries.

Figure 1C:
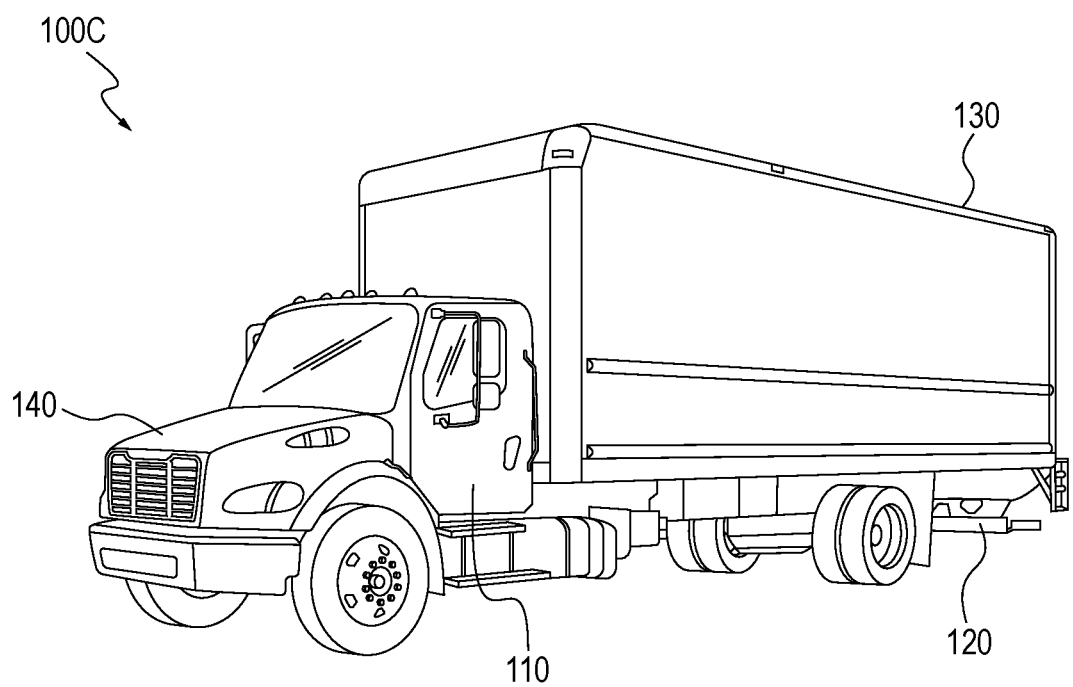
FIG. 1C is another perspective view of a city delivery truck. This particular truck is a medium duty truck.

FIG. 1C is another perspective view of a city delivery truck 100C. This particular truck 100C is a medium duty truck. Such trucks come in both CDL and non-CDL configurations and are used for the delivery of heavier items such as refrigerators and mechanical equipment. Note that the cargo compartment of the truck 100C is longer than the cargo compartment of the truck of 100B.

Figure 1D:
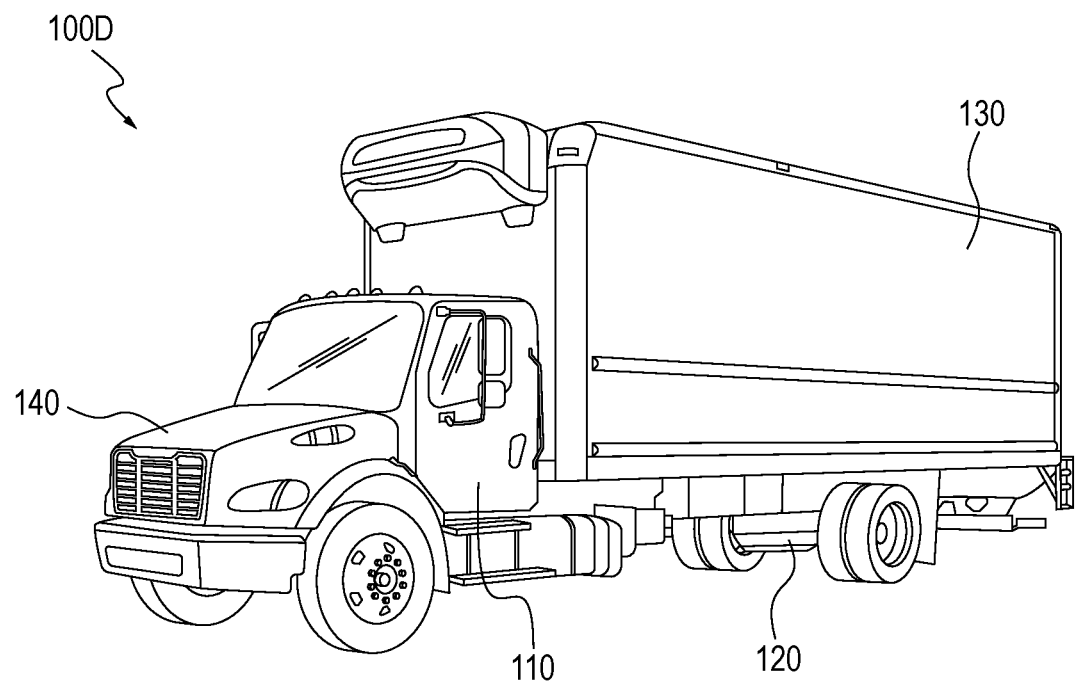
FIG. 1D is another perspective view of a city delivery truck. This particular truck is a refrigerated truck.

FIG. 1D is another perspective view of a city delivery truck 100D. This particular truck is a refrigerated truck.

Each of trucks 100A, 100B, 100C and 100D is known and ubiquitously used in the transportation and shipping industries. Such trucks are available, for example, from Penske System, Inc. of Bloomfield Hills, Michigan and others. Each truck 100A, 100B, 100C, 100D includes a cab 110, a chassis 120 and a cargo compartment 130. In the case of trucks 100A, 100B, 100C, the cargo compartment 130 is mounted on the same chassis 120 as the cab 110. In the case of truck 100D, the cargo compartment 130 includes a refrigeration system.

In each truck 100A, 100B, 100C, 100D, the cargo compartment is enclosed although it is known to have open, flatbed trucks. Each truck 100A, 100B, 100C, 100D also includes an engine compartment 140. The engine compartment holds the engine, an engine cooling system and a power system (not shown) for the vehicle. The power system will include at least one battery, an alternator, and a DC bus.

Figure 2A:
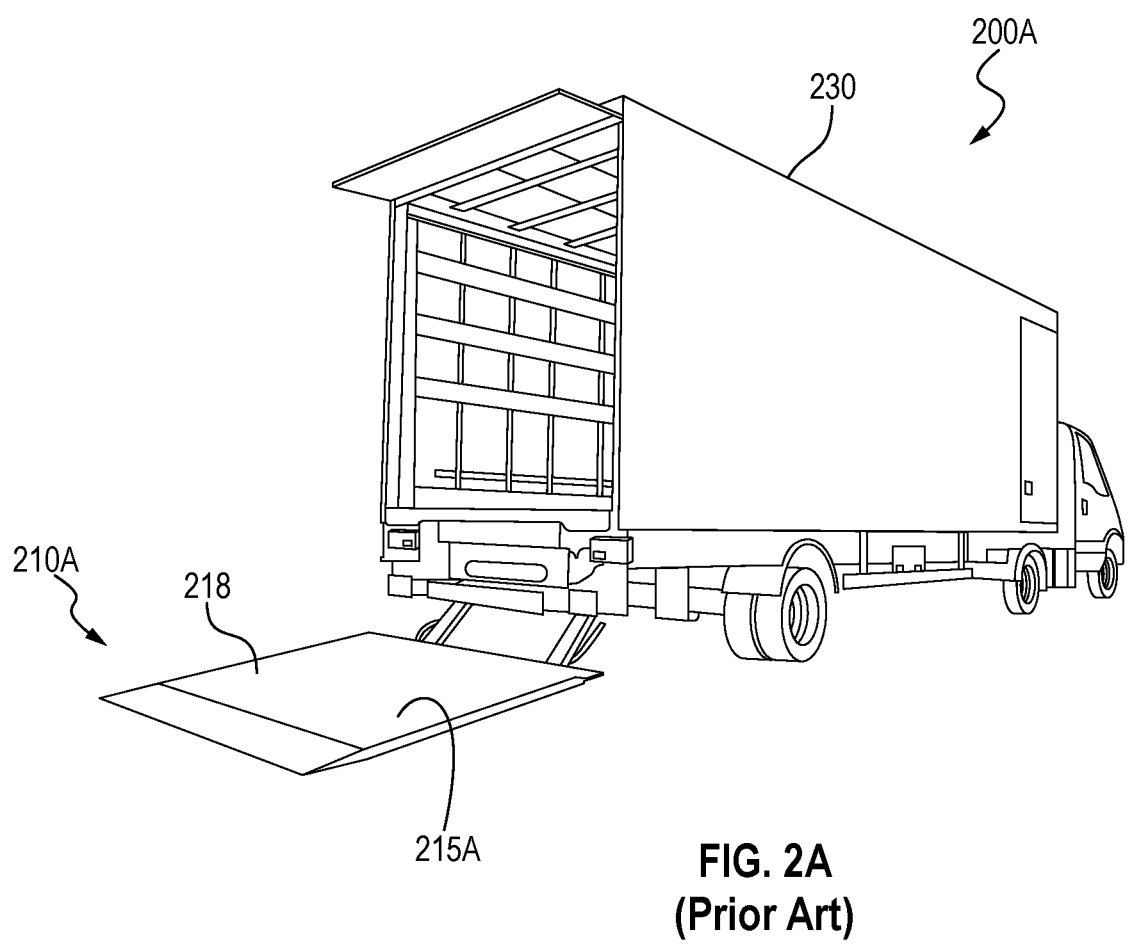
FIG. 2A is a perspective view of a medium duty truck such as the truck of FIG. 1C. Here, the view is taken from the rear of the truck. It can be seen that the truck has been fitted with a lift gate. In this view, the lift gate has been moved into a lowered position.

FIG. 2A is a perspective view of a medium duty truck 200A. Truck 200A may be in accordance with the truck 100C of FIG. 1C. Here, the view is taken from the rear of the truck 200A. It can be seen that the truck 200A has been fitted with a lift gate 215A. In this view, the lift gate 215A has been moved into a lowered position 210A.

It is observed that most lift gates can lift up to 5,000 pounds. Lift gates are commonly controlled by a so-called switch box that resides in the cargo compartment 230. The switch box is used to control the electric motor that moves the lift gate.

Figure 2B:
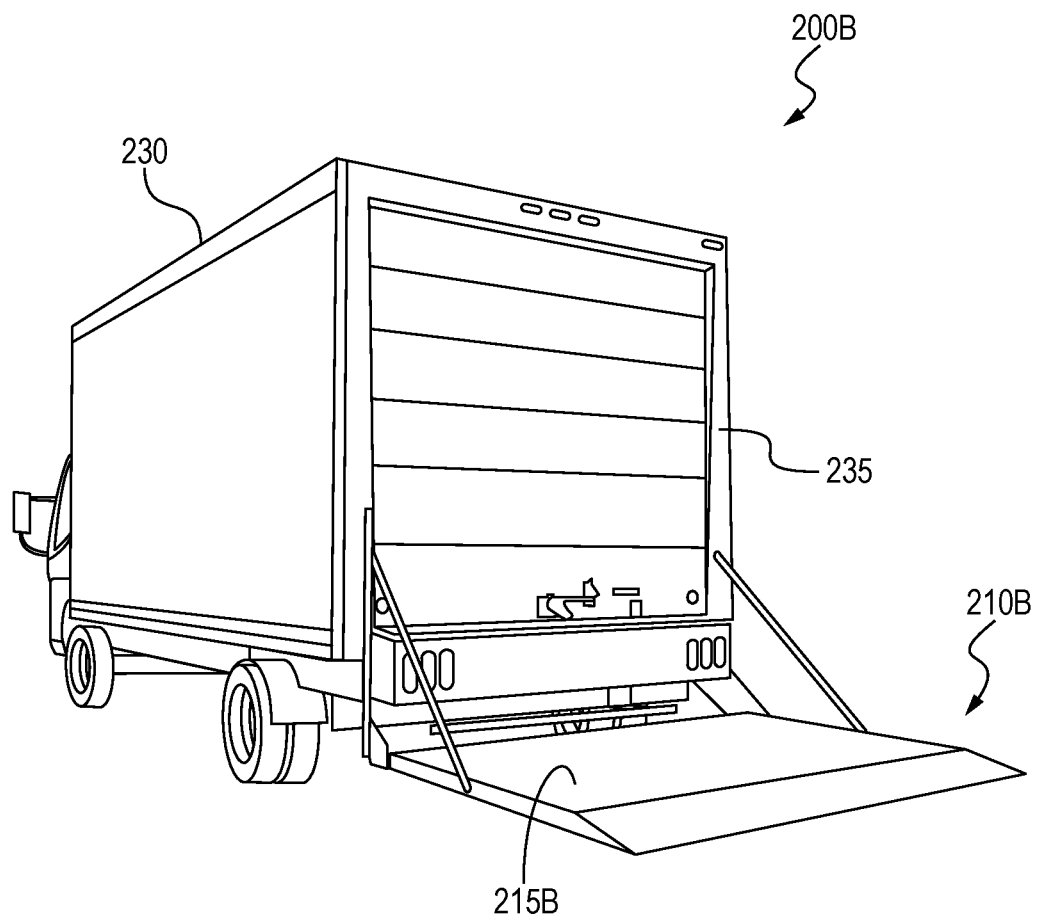
FIG. 2B is a perspective view of a light duty box truck such as the truck of FIG. 1B. The view is again taken from the rear of the truck. It can be seen that the truck has been fitted with a lift gate, with the lift gate being actively moved into a lowered position.

FIG. 2B is a perspective view of a light duty box truck 200B. Truck 200B may be in accordance with the truck 100B of FIG. 1B. The view is again taken from the rear of the truck 200B. It can be seen that the truck 200B has been fitted with a lift gate 215B. Specifically, the lift gate 215B is mounted onto the framing 235 of the cargo compartment 230. In this view, the lift gate 215B is being actively moved into its lowered position 210B.

Figure 2C:
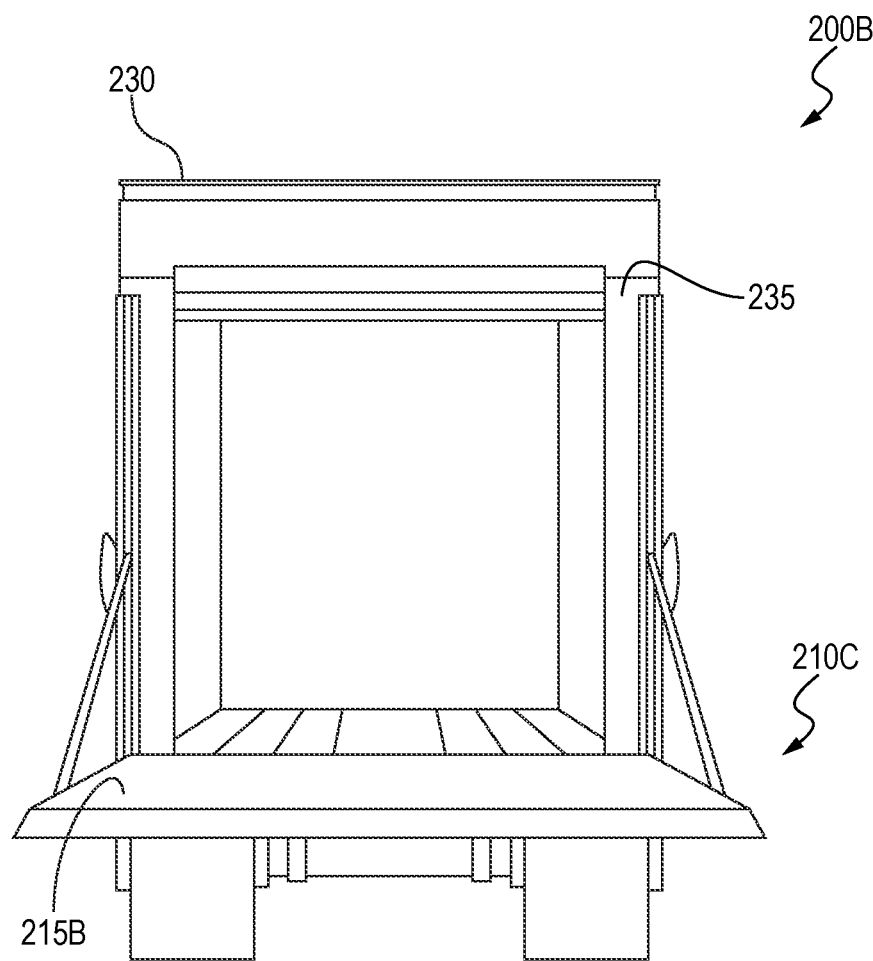
FIG. 2C is a perspective view of a medium duty truck of FIG. 1A. The view is again taken from the rear of the truck. It can be seen that the truck has been fitted with a lift gate, with the lift gate having been moved into its fully raised position.

FIG. 2C is a rear view of the truck 200B of FIG. 2B. In this view, the lift gate 215B has been moved into its raised position 210C. In this raised position 210C, cargo may be readily moved between the back bed of the cargo compartment 230 and the platform of the lift gate 215B. Of interest, this particular lift gate 215B is a so-called rail lift gate, meaning that it is mounted using vertical rails. The rails are secured to the framing 235 as is known in the art.

Figure 2D:
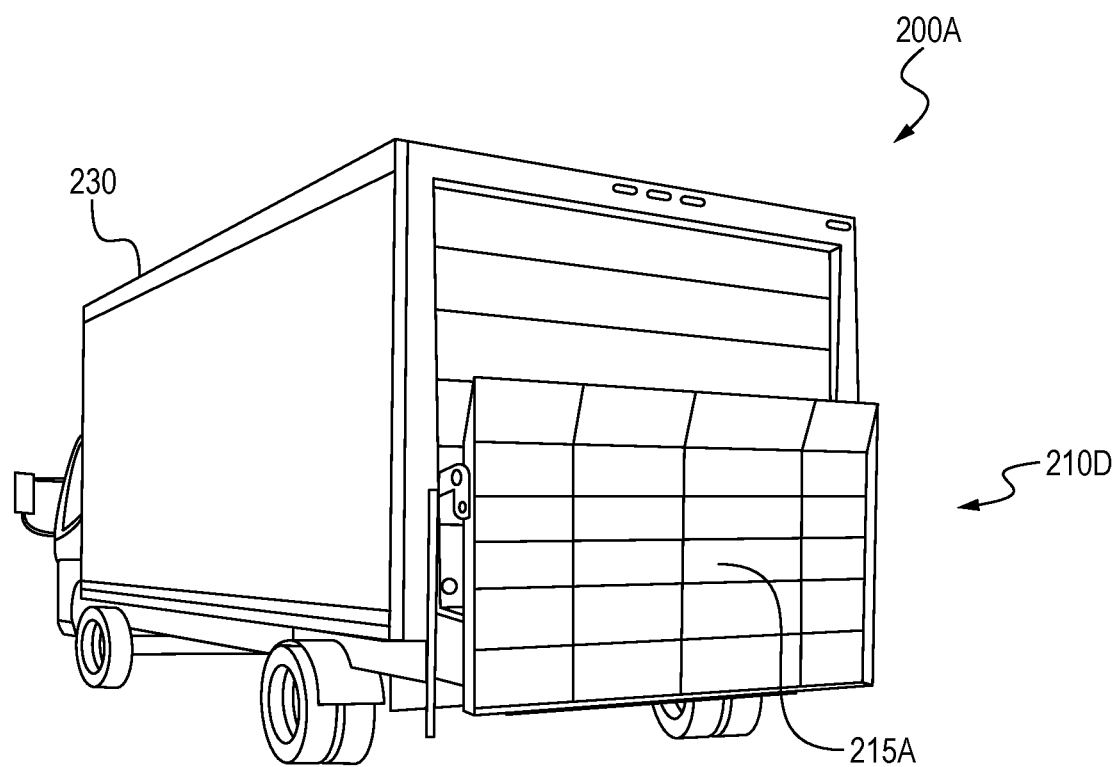
FIG. 2D is another rear, perspective view of the medium duty truck of FIG. 2A. Here, the lift gate has been folded into a transport position.

FIG. 2D is a rear, perspective view of the medium duty truck 200A of FIG. 2A. Here, the lift gate 215A has been folded into a transport position 210D.

Each of the lift gates 200A and 200B resides at a rear of its respective truck. Each of the lift gates 200A, 200B is known and used in the transportation and shipping industries, and is powered by means of a battery. Typically, the battery under the hood that is used to start the engine is also used to drive the liftgate motor. This is referred to as a "straight truck."

Figure 3:
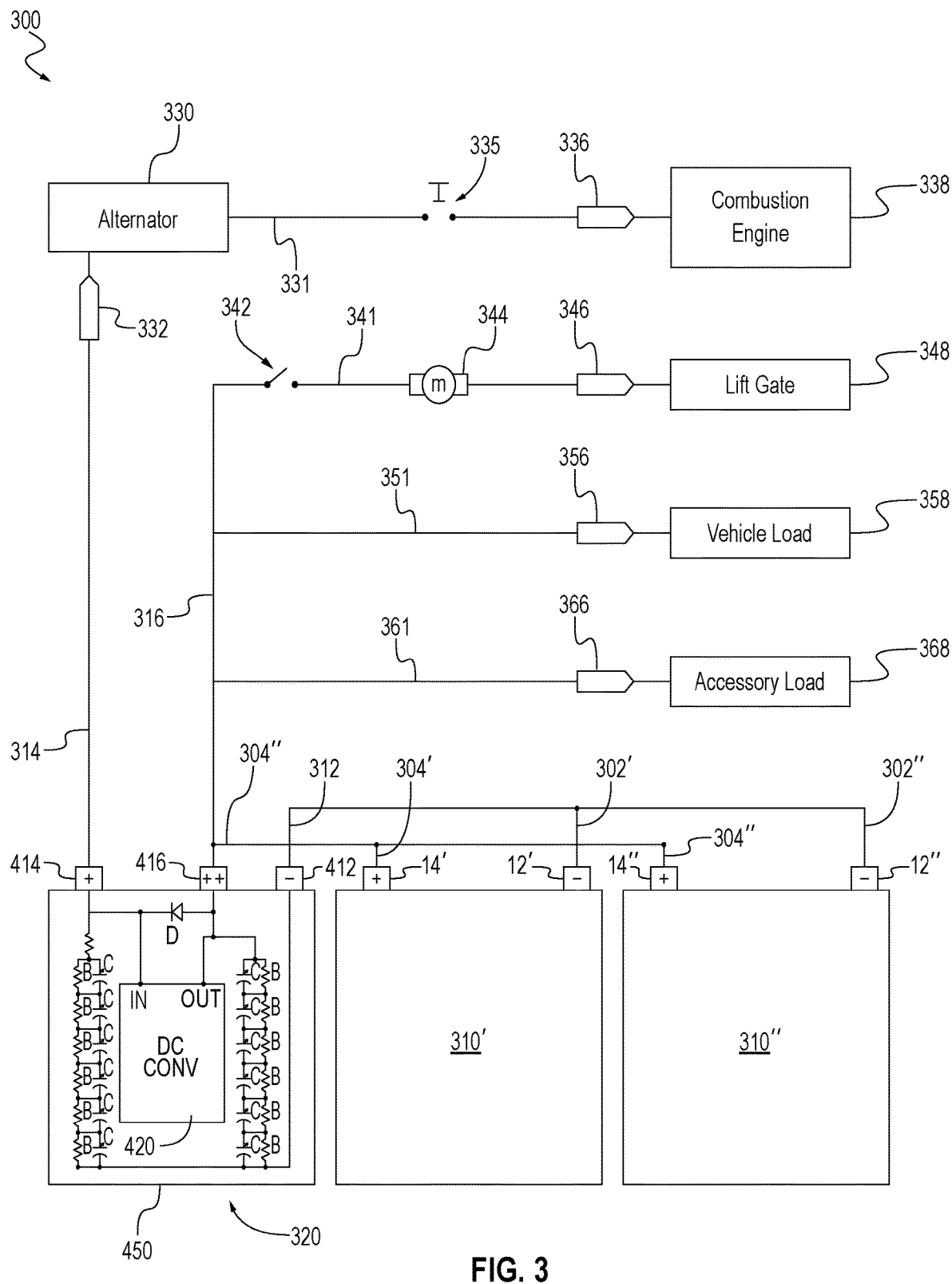
FIG. 3 is a circuit diagram illustrating an electrical system for a delivery vehicle, in one example. In this case, the delivery vehicle includes a lift gate powered by a liftgate motor. The electrical system may be referred to as an engine starting module.

FIG. 3 is a diagram illustrating an electrical system 300 for a truck. The truck may be any truck having a liftgate motor, including any of the illustrative trucks 100A, 200A, or 200B presented above. The electrical system 300 is ideally intended to reside within the engine compartment 140 of a city delivery truck. However, the present disclosure is not limited to such an arrangement unless expressly stated in the claims.

The electrical system 300 first includes at least one, and preferably two, vehicle batteries 310. In the illustrative arrangement of FIG. 3, a pair of batteries 310', 310" is shown. These may be referred to as a first battery 310' and a second battery 310". It is understood that the electrical system 300 may utilize a third or even a fourth battery depending on the power needs of the vehicle 100 and its liftgate motor 344.

The first vehicle battery 310' includes a negative terminal 12' and a positive terminal 14'. Cable 302' is connected to the negative terminal 12' while cable 304' is connected to the positive terminal 14'. Likewise, the second vehicle battery 310" includes a negative terminal 12" and a positive terminal 14". Cable 302" is connected to the negative terminal 12" while cable 304" is connected to the positive terminal 14". It is recognized that the industry sometimes uses the term "electrode" rather than terminal.

The electrical system 300 also includes a capacitor 320. The capacitor 320 is comprised of two banks of ultra-capacitors, or UC cells. The banks of UC cells are shown at 410, 430 in the enlarged view of FIG. 4. Six UC's are shown in series in the first bank of ultra-capacitors 410, while six UC's are separately shown in series in the second bank of ultra-capacitors 430. Thus, a 6×2 array of UC cells is formed, making up the capacitor 320.

The batteries 310', 310" and the capacitor 320 are both used for storing electrical charge. However, they operate in very different ways.

The electrodes (e.g., 12', 14') in the batteries 310', 310" are separated by a chemical substance called an electrolyte. Electrical energy is released in response to a chemical reaction involving the electrodes and the electrolyte. Once the chemicals have been depleted, the reactions stop and the battery is no longer able to provide a charge. Batteries 310', 310" generally are not rechargeable, or to the extent they are, charging is quite slow and limited.

Capacitors, on the other hand, can be charged (or re-charged) almost instantly. Capacitors weigh less than batteries and typically do not contain chemicals or toxic metals. The downside though is that capacitors can store only small amounts of power. Capacitors use static electricity (or electrostatics) rather than chemistry to store energy. A capacitor utilizes two opposing conducting metal plates with an insulating material there between. The insulating material is referred to as a dielectric. Positive and negative electrical charges build up on the plates, preventing them from coming into contact. The dielectric allows a capacitor of a certain size to store more charge at the same voltage.

Some capacitators are referred to as super-capacitors. A super-capacitor (or ultra-capacitor) differs from an ordinary capacitor in that its plates effectively have a much bigger surface area and the distance between them is much smaller. In the case of a super-capacitor, the plates are made from a metal coated with a porous substance such as powdery, activated charcoal. The porosity provides the greater surface area for storing more charge, providing more Farads. Also of interest, in a super-capacitor there is no dielectric material per se; instead, both plates are soaked in an electrolyte and separated by a very thin insulator.

When the plates are charged, an opposite charge forms on either side of the separator, creating what is called an electric double-layer. The double-layer is extremely thin, perhaps only one molecule thick (compared to a dielectric that might range in thickness from a few microns to a millimeter or more in a conventional capacitor). For this reason, super-capacitors are sometimes referred to as double-layer capacitors, or electric double-layer capacitors ("EDLC's").

The capacitance of a capacitor increases as the area of the opposing plates increases and also as the distance between the plates decreases. Capacitors have many advantages over batteries. As noted above, they generally weigh less. They can also be charged and discharged hundreds of thousands of times without wearing out. However, by design they are unable to store a charge as do batteries, or at least not a usable charge.

Super-capacitors are ideal for providing an initial charge for an internal combustion engine ("ICE"). For example, a super-capacitor may be used to provide a charge for the starter on an ICE car or motorcycle. Beneficially, the voltage delivered by a super-capacitor can be scaled by increasing or decreasing the number of ultra-capacitors placed in series.

In FIG. 3, the capacitor 320 is in electrical communication with an alternator 330 by means of cable 314. Bus 332 is provided between the positive terminal 414 and the alternator 330 along cable 314.

The alternator 330 serves as a DC voltage source. (It is understood that the alternator 330 will have a negative DC bus and a positive DC bus, not shown.) The alternator 330 is in electrical communication with a starting relay 335 (or relay start) by means of wire 331. When the relay start 335 is closed, power is sent to a starter 336 to start (or "crank") the vehicle engine 338. Bus 336 is provided to connect cable 331 to the engine 338.

In the system 300 of FIG. 3, the novel capacitor 320 may be colloquially referred to as an "Assist Box." This is because the capacitor 320 is placed in the electrical system 300 to support the batteries 310', 310". (For marketing purposes, the capacitor 320 may be referred to as an "Ioxus Box.") The Assist Box may be a Group 31 sized, three-terminal power module. The terminals represent a negative electrode and two positive electrodes. Cable 312 connects to the negative electrode, and is also in electrical communication with cables 302' and 302" from the negative electrodes of the vehicle batteries 310', 310". Cable 314 connects to one positive electrode while cable 316 connects to the other positive electrode. Of interest, cable 316 is also in electrical communication with cables 304' and 304" from the positive terminals of the vehicle batteries 310', 310".

In one aspect, the capacitor (or Assist Box) 320 serves to replace what might otherwise be a third or fourth battery in the truck 100. The capacitor 320 will work with either flooded or AGM batteries. Because the ultra-capacitors 410, 430 are divided into two groups within the capacitor 320, two separate electrical systems are essentially formed.

Cable 316 also extends from capacitor 320. Cable 316 sends electrical energy to support vehicle loads 358 and accessory loads 368. The term vehicle loads 358 generally refers to the hotel load internal to the vehicle while the term accessory load 368 generally refers to external loads that may be carried by the vehicle, such as lighting for a trailer or aftermarket parts. Wire 351 extends from cable 316 to bus 356, to provide energy to the vehicle load 358. At the same time, wire 361 extends from cable 316 to bus 366 to provide energy to the accessory load 368.

As noted above, the electrical system 300 functions in part to provide power to a lift gate (e.g., 215A). To this end, cable 316 is also in electrical communication with wire 341 by means of a switch 342. The switch 342 is representative of the switch box discussed above.

Wire 341 extends from the switch box 342 and provides signals to a liftgate motor 344. The liftgate motor 344 powers a lift gate 215 through bus 346. The lift gate 348 has a lift gate platform (seen at 218 in FIG. 2A). The platform 218 is dimensioned to move both workers and cargo up and down between street (or sidewalk) level and a truck bed level.

The liftgate motor 344 resides in the cargo compartment 230, and is preferably located at the back of the cargo compartment 230 adjacent the lift gate 348. The liftgate motor 344 is powered by DC power, and moves the lift gate 348 up and down in response to instructions provided through the switch box 342. The switch box 342 serves as a user interface and is manually operated by an operator. The switch box 342 may include a panel of options for cycling a lift gate platform up and down, including speed control and emergency shut-off. Wire 341 is preferably an elongated electrical cable that extends from the engine compartment 140 back to the back of the cargo compartment 230 to the switch box 342. Wire 341 may be, for example, between 30 and 40 feet.

Figure 4:
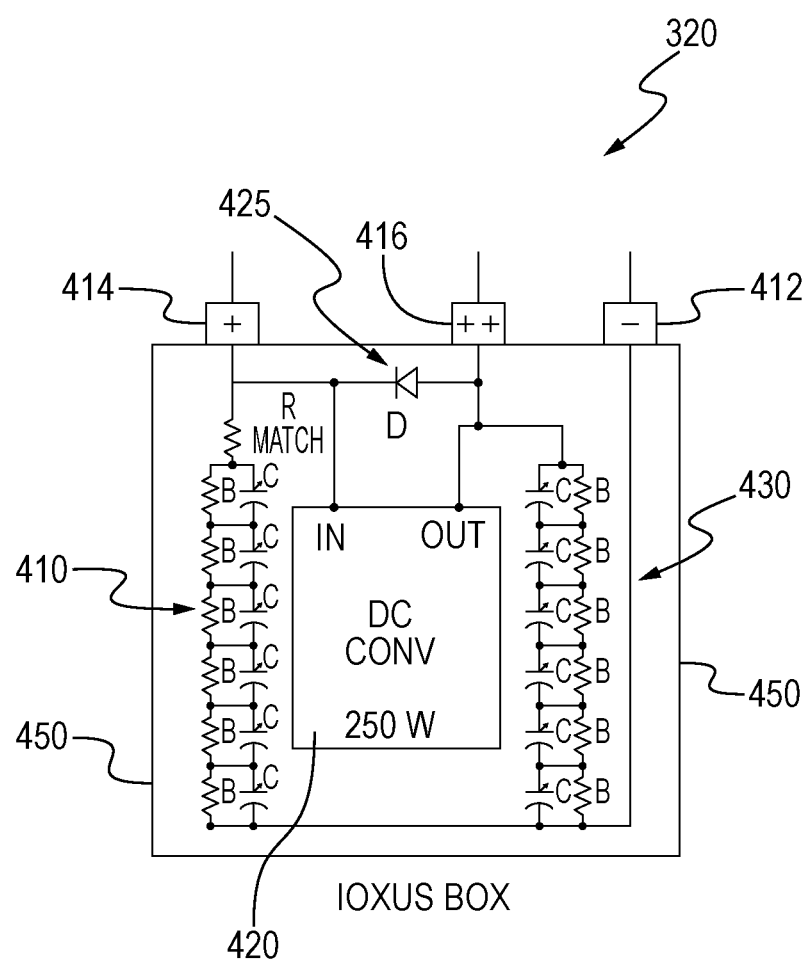
FIG. 4 is an enlarged diagram illustrating the use of ultra-capacitors in the circuit diagram of FIG. 3. It can be seen that a 6×2 array of ultra-capacitor cells is provided. The two banks of ultra-capacitors reside within a housing.

FIG. 4 is an enlarged view of the capacitor 320 of FIG. 3. The capacitor 320 includes three terminals, indicated as a negative electrode 412, a first positive electrode 414 and a second positive electrode 416. The electrodes 412, 414, 416 are connected to cables 312, 314, 316, respectively, as noted in connection with FIG. 3.

The capacitor 320 includes a housing 450. The three terminals 412, 414, 416 extend out from the housing 450. Residing within the housing 450 is a series of ultra-capacitors ("UC's). A first group (or "bank") of UC's is indicated at 410. These UC's 410 represent first UC cells placed in series. A second bank of UC's is indicated at 430. These UC's 430 represent second UC cells placed in series.

Preferably, each of the two banks of UC's 410, 430 comprises six UC cells yielding a total capacitance of at least 1,000 Farads. The two banks of UC's 410, 430 are electrically connected by a diode 425. When a voltage in the first capacitor bank 410 is less than, or drops below, a voltage in the second capacitor bank 430, the first 410 and second 430 capacitor banks are placed in parallel so that the batteries 310', 310" can supply charge to the first capacitor bank 410, through the diode 425.

Ideally, the second bank of UC's 430 contains enough energy to power the electric motor 344 for the lift gate 348 through at least two operating cycles. This protects the lift gate 348 if the batteries 310', 310" go weak, ensuring that the operator can always store the lift gate 348 and drive the vehicle 100.

In one embodiment, each bank of UC's 410, 430 stores over 50,000 Joules of energy. This energy that can be released instantaneously, and much faster than either of the batteries 310', 310" can. Because each UC in the capacitor banks 410, 430 will have its own equivalent series resistance (ESR), the UC cells will not all absorb charge equally. Placing the batteries 310', 310" in parallel with the UC banks 410, 430 will accomplish UC balancing within the banks 410, 430.

The first bank of UC cells 410 remains directly connected to the alternator 330. In this way, the UC cells in the first capacitor bank 410 are always charged first. These UC's 410 absorb all of the energy coming out of the alternator 330 without the batteries 310', 330" dragging the voltage down. In one aspect, the UC cells of the first capacitor bank 410 may be charged up to a maximum alternator voltage of 14.5 volts. The UC cells in the first capacitor bank 410 remain charged constantly, either from the alternator or through the diode 425, and do not get used for any other function other than to start the vehicle (e.g., 200A).

Once the first bank of UC's 410 is charged, the second bank of UC's 430 will also be charged. The UC cells in the second bank of capacitors 430 may also be charged up to 14.5 volts. This is done by means of an internal, high-current DC/DC converter 420. The converter 420 is preferably an integrated DC/DC boost converter. The DC converter 420 essentially serves as a secondary alternator.

The DC/DC converter 420 includes an input side and an output side. The input side is connected to the first bank of UC's 410, with an ultra-low $F_v$ diode 425 between the UC banks 410, 430. The output side is connected to the second bank of UC' 430 and the batteries 310', 310". In one aspect, the DC/DC converter 420 is configured to boost voltage from 8 volts DC to 14.5 volts DC.

The second bank of capacitors 430 is in parallel with the batteries 310', 310". The two or more batteries 310', 310" power the rest of the delivery vehicle 100 through bus connections 356, 366. In addition, and as shown in FIG. 3, the two or more batteries 310', 310" power the liftgate motor 344. Placing the UC banks 410, 430 in the same circuit enables the peak currents that are generated from the liftgate motor 344 to be managed by the capacitor 320. Beneficially, dividing the function of the batteries 310', 310" with the second capacitor bank 430 reduces the need to have the batteries 310', 310" start the delivery vehicle by adding one bank of UCs 410 for that purpose and another one 430 for supporting the rest of the truck, its batteries and of course the lift gate 348.

The parallel circuitry between the second bank of UC's 430 and the batteries 310', 310" allows a bi-directional flow between the batteries 310', 310" and the second bank of UC's 430. This provides a system wherein the bank of capacitors 430 is configured to "re-charge" a battery when the state of charge and voltage in the bank of capacitors 430 is higher than either battery 310', 310". Stated another way, the capacitor bank 430 boosts the charging voltage of the first 310' and second 310" batteries when the electric motor 344 of the lift gate 348 is in operation. This, in turn, increases the life of the batteries 310', 310". In addition, the efficient charge acceptance and discharge rate of the capacitors 430 can allow the capacitors 430 to mitigate some of the spikes and drops in power typical during operation of the liftgate motor 344. This arrangement also prevents severe dips in the battery voltage, enabling longer battery life. In one embodiment, the batteries 310', 310" are configured to put out at least 200 Amps of current for at least two minutes for operating the motor 344 for the lift gate 210.

In one embodiment, the capacitor (or Assist Box) 320 holds a current controller (shown as part of bus 332). The controller limits or controls DC current coming in from the alternator 330. The current controller, or current limiter, may comprise at least one of a positive-temperature-coefficient resistor and a resistive bridge.

In one aspect, current supplied to the liftgate motor 344 will be generated proportionally from both the second bank of UC's 430 and the batteries 310', 310". Additionally, because current can flow between the second bank of UC's 430 and the batteries 310', 310", the available charge and voltage of the second bank of UC's 430 will also generally move towards a charge and voltage equilibrium relative to that of the batteries 310', 310" when the alternator 330 is in an off state. Such voltage equilibrium may generally be less than the state of charge and voltage of the second bank of UC's 430 if it were to be electrically isolated from the batteries 310', 310".

Additional features may be included with the electrical system 300. For example, the electrical system 300 may comprise a sensor. The sensor senses the internal resistance of the batteries 310', 310". This enables a user to determine the condition of the batteries 310', 310". Those of ordinary skill in the art will understand that when a battery sits idle, a chemical reaction can take place in the cells that causes copper sulfate to build up on the battery terminals. This, in turn, rapidly increases the internal resistance of the battery, reducing its ability to generate the charge needed to crank an engine.

The power system 300 may further include a micro-controller. The micro-controller receives signals from the sensor that are indicative of internal resistance. Using a transceiver, the micro-controller then sends the signals to a computer (which may be a network server or may be an application running on a portable communications device, or both). Signals are sent using a wireless communications system.

The signals are processed by the computer such that a remote operator is able to review the signals and determine the status of the battery in real time. In addition, the micro-controller may have a GPS module. In this instance, the micro-controller sends signals indicative of GPS coordinates. In this way, the operator may determine a location of the power system 300 at any given moment.

There are multiple advantages to the electrical system 300 described herein. These include preventing the lift gate 348 from getting stuck with a poorly charged or dead battery. The electrical system 300 ensures that a re-start will always take place regardless of the duration of re-charge time in between delivery stops. The electrical system 300 also prevents both the batteries 310', 310" and the starter motor from aging due to excess drops in voltage during repeated starts. In addition, the electrical system 300 handles the peak currents that are created during operation of the lift gate 348, thereby helping the vehicle's batteries last longer.

Combined, the use of ultra-capacitors 410, 430 to both start the delivery vehicle (e.g., 200A) and to support peak currents in the liftgate 348 provides a novel benefit.

In view of the engine starting module 300 described above, a method of providing electrical energy to a vehicle is also provided herein. Providing electrical energy means providing power to reset electronics and/or to start a combustion engine. Providing electrical energy also means operating a liftgate associated with a delivery vehicle.

Figure 5A:
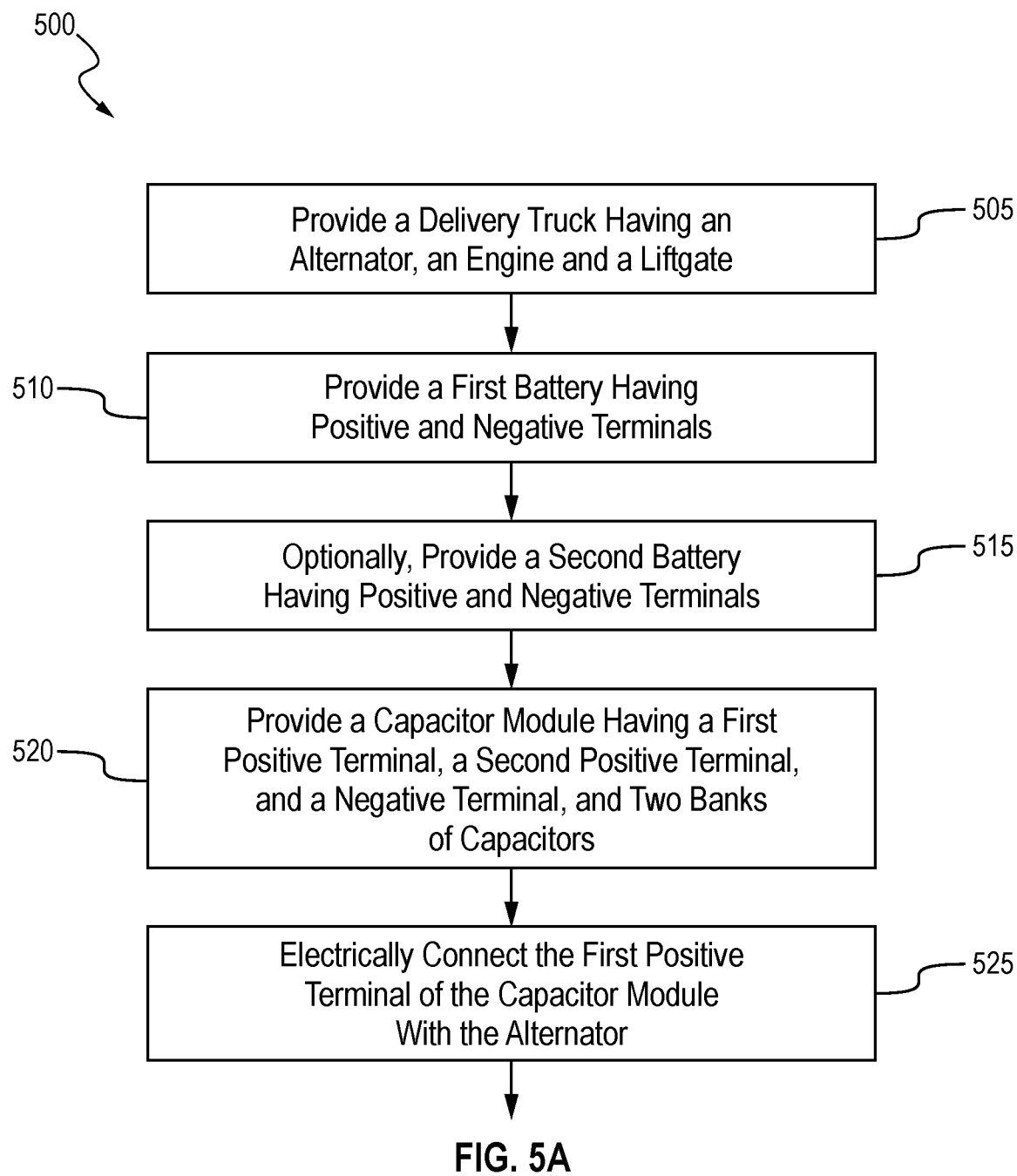
FIGS. 5A, 5B and 5C present a single flow chart showing steps for operating a liftgate for a vehicle, in one embodiment. This is done by using an engine starting module such as the engine starting module of FIG. 3.
Figure 5B:
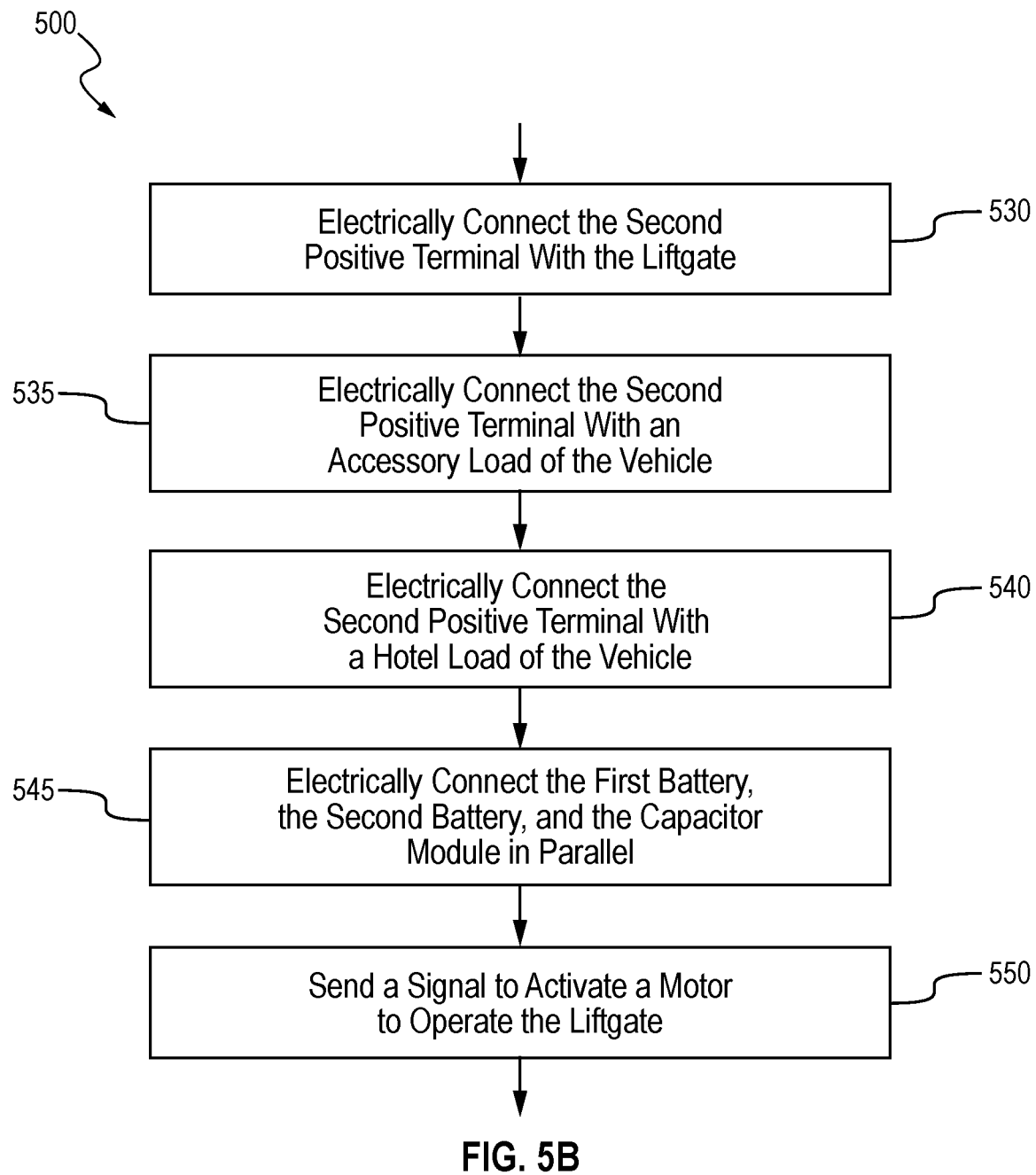
Figure 5C:
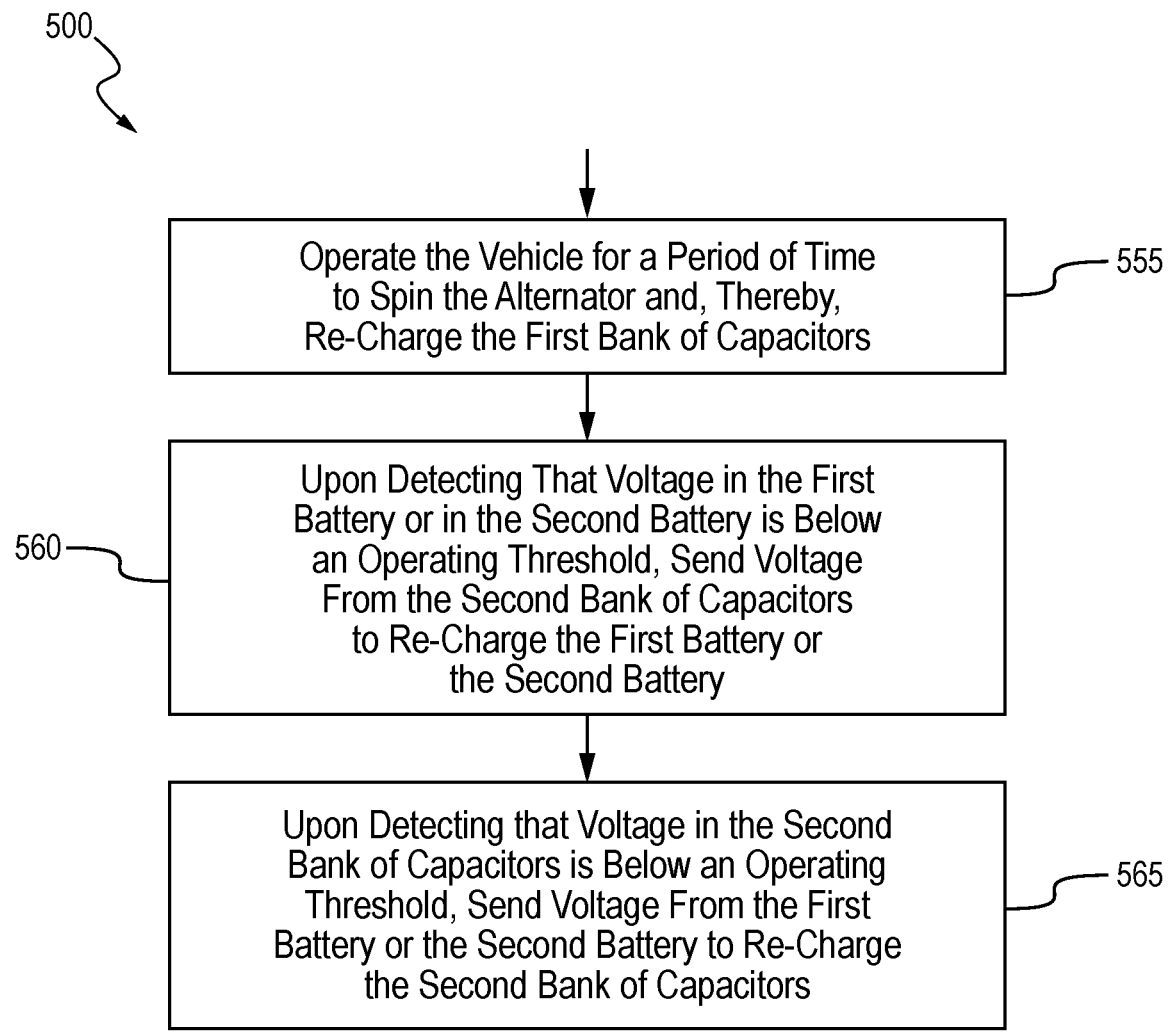

FIGS. 5A, 5B and 5C present a single flow chart showing steps for a method 500 for operating a liftgate, in one embodiment. The method 500 first includes providing a delivery truck. This is shown at Box 505. The delivery truck may be any of the trucks illustrated in FIG. 100A, 100B, 100C or 100D, so long as they include a liftgate. The vehicle will also have an alternator and an internal combustion engine.

The method 500 next includes providing a first battery. This is seen in Box 510. The first battery is preferably a lithium ion battery, although it may also be, for example, a traditional lead acid battery. The first battery will have a positive terminal and a negative terminal.

The method 500 also comprises providing a second battery. This is provided at Box 515. The second battery is preferably a lithium ion battery, although it may also be, for example, a traditional lead acid battery. The second battery will also have a positive terminal and a negative terminal.

The method 500 further includes providing a capacitor module. This is shown in Box 520. The capacitor module will comprise a first positive terminal and a second positive terminal. In addition, the capacitor module will have a negative terminal. A housing will support the terminals.

The capacitor module may be in accordance with the capacitor 320 presented in FIGS. 3 and 4. In this respect, the capacitor module will house two banks of capacitors. Each bank of capacitors will comprise a series of ultra-capacitors. The first bank of UC's is in electrical communication with the first positive terminal, while the second bank of UC's is connected to the second positive terminal. The first and second banks of capacitors are positioned within the housing of the capacitor module, in parallel, and are separated by a diode.

The method 500 next provides for electrically connecting the first positive terminal of the capacitor module with the alternator. This is seen at Box 525 of FIG. 5A. The connection may be made using a cable and a bus. The method 500 then includes electrically connecting the second positive terminal of the capacitor module with the liftgate. This is indicated at Box 530 of FIG. 5B.

The method 500 next provides for electrically connecting the second positive terminal of the capacitor module with the accessory load. This is shown at Box 535 of FIG. 5B. Additionally, the method 500 includes electrically connecting the second positive terminal of the capacitor module with the hotel load. This is provided at Box 540.

The method 500 also includes electrically connecting the first battery, the second battery and the capacitor module in parallel. This is seen in Box 545. This arrangement is in accordance with the system 300 of FIG. 3.

The method 500 additionally comprises sending a signal to activate an electric motor. This step is provided in Box 550 of FIG. 5B. The motor is associated with the liftgate. Sending the signal to the motor may cause the liftgate to be lowered, to be raised, or to stop at any point along its path of movement. Operation of the liftgate involves a switch, a user interface and the electric motor.

The method 500 may also include operating the vehicle for a period of time. This is seen at Box 555 of FIG. 5C. Operating the vehicle may mean driving the vehicle, idling the vehicle, or some combination thereof. Operating the vehicle need not be continuous operation, but may be intermittent meaning that multiple vehicle stops occur, or even that the vehicle sits idle for a period of time between starts (or attempts at starting). In any instance, the result is that the alternator spins, generating direct current energy. This, in turn, charges—re-charges the first bank of capacitors.

The first bank of UC's may be in accordance with the capacitor bank 410 shown in in FIG. 4. The capacitor bank 410 comprises a series of individual ultra-capacitors, with each ultra-capacitor being in parallel with a corresponding resistor.

Upon detecting that voltage in the first battery or in the second battery is below an operating threshold, voltage is sent from the second bank of capacitors to re-charge the corresponding battery. This is provided in Box 560. This may be done automatically through voltage balancing. Alternatively, it may be done automatically through operation of an isolation switch using a controller. In this instance, the controller sends a signal to close the isolation switch until the batteries are re-charged.

Reciprocally, upon detecting that voltage in the second bank of capacitors is below an operating threshold, voltage is sent from the first and/or second battery to the second bank of capacitors to re-charge the capacitors. This is provided in Box 565. This again may be done automatically through voltage balancing. Alternatively, it may be done automatically through operation of an isolation switch using a controller. In this instance, the controller sends a signal to close the isolation switch until the ultra-capacitors in the second bank of capacitors are re-charged.

In one aspect, an operator of the vehicle may press a start button associated with a user interface. This sends a signal that causes the isolation switch to close. When the isolation switch closes, energy is released from the bank of super capacitors to the vehicle batteries, or vice versa, allowing for voltage balancing.

The method 500 may additionally comprise providing control logic for a bank of ultra-capacitors. This is a part of the steps of Boxes 560 and 565 The control logic resides in a control circuit and controls a flow of current between the bank of super capacitors and the vehicle battery. In one embodiment, the control logic comprises a circuit that modulates a flow of current. In one embodiment, the control logic comprises a comparator, which may be firmware or software.

The method 500 also includes monitoring a voltage level of the battery of the vehicle. This too is a part of the steps of Boxes 560 and 565 of FIG. 5B.

Upon detecting that the voltage level of the vehicle battery is below a recharge voltage threshold, the method 500 includes sending a signal to close the isolation switch. This allows the ultra-capacitors in the second bank to re-charge the vehicle battery.

The control logic is configured to modulate discharge of the plurality of super capacitors based on a comparison of the voltage level of the vehicle battery to the operating threshold so as to raise the voltage level. Optionally, a timer may be used to re-open the isolation switch after a designated period of time if the operating threshold is not reached. Otherwise, control logic opens the switch when the re-charge threshold voltage level is reached.

Optionally, the isolation switch remains closed while the vehicle is operated. In this way, the super capacitors are constantly charged by the alternator and/or the vehicle battery for as long as the battery voltage is above the operating threshold, such as 9 volts. In one aspect, the re-charge time for the bank of ultra-capacitors 430 is about 15 minutes. Of interest, the control logic draws its power from the ultra-capacitors 430.

As can be seen, a novel power system for operating a liftgate is provided.

It will be appreciated that the inventions are susceptible to modification, variation and change without departing from the spirit thereof. For example, the electrical power system 300 has been described herein in the context of operating a lift gate for a working truck. However, the invention has equal application to supporting dump trailers and heavy load leveling systems. For purposes of this disclosure, the term "lift gate" is intended to include lifting mechanisms used on dump trailers and leveling motors. Further, uses and variations of the hybrid power module may fall within the spirit of the claims, below.

We claim:

1. An electrical power system for a delivery vehicle, with the delivery vehicle having a relay start and a combustion engine, and a liftgate powered by a liftgate motor, and the electrical power system comprising:
    a first battery;
    an alternator;
    a super capacitor comprising a first capacitor bank and a second capacitor bank, wherein each of the first capacitor bank and the second capacitor bank comprises ultra-capacitor cells placed in series; and
    a diode connecting the first capacitor bank and the second capacitor bank;
    wherein:
        the first battery resides in parallel with the second capacitor bank, and together supply power to the liftgate motor; and
        the first capacitor bank is in electrical communication with the alternator and supplies power, with the alternator, to relay start for the delivery vehicle to start the engine.

2. The electrical power system of claim 1, wherein:
    the electrical power system further comprises a second battery, with the second battery also residing in parallel with the second capacitor bank;
    the delivery vehicle has an engine compartment and a cargo compartment;
    the first battery, the second battery and the super capacitor together reside within the engine compartment of the delivery vehicle;
    the liftgate motor is secured onto or behind the cargo compartment; and
    when a voltage of the first capacitor bank is less than that of the second capacitor bank, power is supplied by the first battery and the second battery through the diode to the first capacitor bank.

3. The electrical power system of claim 2, wherein:
    the super capacitor comprises a housing having three terminals; and
    the first capacitor bank and the second capacitor bank reside together within the housing.

4. The electrical power system of claim 3, wherein:
    the three terminals comprise a first positive terminal, a second positive terminal, and a negative terminal;
    the first capacitor bank is in electrical communication with and is charged by the alternator through the first positive terminal; and
    the second capacitor bank is in electrical communication with the liftgate motor through the second positive terminal, with electrical communication controlled by a switch.

5. The electrical power system of claim 4, wherein:
    when fully charged by the first and second batteries, the second capacitor bank contains enough energy to power the liftgate motor for the lift gate through at least two operating cycles without the first battery or the second battery.

6. The electrical power system of claim 4, wherein each of the first capacitor bank and the second capacitor bank stores over 50,000 Joules of energy.

7. The electrical power system of claim 4, further comprising:
    an integrated DC/DC boost converter also residing within the housing of the super capacitor;
    and wherein the DC/DC converter has an input side in electrical communication with the first capacitor bank, and an output side in electrical communication with the second capacitor bank allowing charge to be sent from the first capacitor bank to the second capacitor bank.

8. The electrical power system of claim 4, wherein the second capacitor bank is configured to put out at least 200 Amps of current for at least two minutes for operating the motor for the lift gate.

9. The electrical power system of claim 4, wherein:
    the second capacitor bank provides power to a hotel load of the delivery vehicle through the second positive terminal.

10. The electrical power system of claim 4, wherein:
    the first capacitor bank is in electrical communication with the alternator by means of an alternator cable connecting the alternator to the first positive terminal; and
    the second capacitor bank is configured to support peak currents in the liftgate motor when the liftgate motor is in operation.

11. The electrical power system of claim 10, wherein:
    each of the first capacitor bank and the second capacitor bank comprises 6 ultra-capacitors, thereby providing two sets of six capacitors, in series; and
    the first and second capacitor banks o together yield a total capacitance of at least 1,000 Farads.

12. The electrical power system of claim 4, wherein the first battery and the second battery are each lithium-ion batteries.

13. A delivery vehicle, comprising:
an engine compartment, a combustion engine residing within the engine compartment, a cab and a cargo compartment;
a lift gate system residing on the cargo compartment, the lift gate system comprising:
an electrical liftgate motor;
a lift gate; and
a user interface for controlling the liftgate motor; and
an electrical system, wherein the electrical system comprises:
at least one battery;
an alternator;
a relay start in electrical communication with the engine;
a first capacitor bank; and
a second capacitor bank;
wherein:
the first capacitor bank is configured to provide power to the relay start to start the engine such that the engine may be started regardless of a voltage condition of the at least one battery; and
the second capacitor bank and the at least one battery are configured to provide power to the electrical liftgate motor.

14. The delivery vehicle of claim 13, wherein:
the at least one battery comprises a first battery and a second battery;
the first capacitor bank and the second capacitor bank reside together within a capacitor housing;
each of the first capacitor bank and the second capacitor bank comprises a plurality of ultra-capacitor (UC) cells placed in series; and
the first capacitor bank is in electrical communication with the alternator and supplies power, with the alternator, to the relay start to start the engine.

15. The delivery vehicle of claim 14, wherein the electrical power system further comprises:
a diode connecting the first capacitor bank and the second capacitor bank; and
a DC/DC converter;
wherein:
the first battery and the second battery reside in parallel with the second capacitor bank, and together supply power to the electrical liftgate motor;
when a voltage of the first capacitor bank is less than a voltage of the second capacitor bank, power is supplied by the first battery and the second battery, through the diode, to re-charge the first capacitor bank.

16. The delivery vehicle of claim 15, wherein when the first capacitor bank is fully charged, the DC/DC converter transmits current from the first capacitor bank to the second capacitor bank to charge the second capacitor bank.

17. The delivery vehicle of claim 15, wherein:
the capacitor housing has three terminals, comprising a first positive terminal, a second positive terminal, and a negative terminal;
the first capacitor bank is in electrical communication with and is charged by the alternator through the first positive terminal; and
the second capacitor bank is in electrical communication with the liftgate motor through the second positive terminal.

18. The delivery vehicle of claim 17, wherein:
the second capacitor bank also provides power to a hotel load of the delivery vehicle through the second positive terminal.

19. The delivery vehicle of claim 18, wherein:
the first capacitor bank is in electrical communication with the alternator by means of an alternator cable connecting the alternator to the first positive terminal; and
the second capacitor bank is configured to support peak currents in the liftgate motor when the liftgate motor is in operation.

20. The delivery vehicle of claim 19, wherein:
each of the first capacitor bank and the second capacitor bank comprises 6 ultra-capacitors, thereby providing two sets of six capacitors, in series; and
the first and second capacitor banks together yield a total capacitance of at least 1,000 Farads.

21. A method for operating a liftgate, comprising:
providing a delivery vehicle, the delivery vehicle having an alternator, a combustion engine, a first battery, a capacitor module, and a liftgate; and
sending a signal to operate the liftgate;
wherein:
the capacitor module comprises a first capacitor bank and a second capacitor bank,
each of the first capacitor bank and the second capacitor bank comprises a series of ultra-capacitor cells,
a diode connects the first capacitor bank and the second capacitor bank;
the first battery resides in parallel with the second capacitor bank, and together supply power to the liftgate motor; and
the first capacitor bank is in electrical communication with the alternator and supplies power, with the alternator, to a relay start for the delivery vehicle to start the combustion engine.

22. The method of claim 21, wherein:
the capacitor system further comprises a second battery, with the second battery also residing in parallel with the second capacitor bank;
the delivery vehicle has an engine compartment and a cargo compartment;
the first battery, the second battery and the capacitor module together reside within the engine compartment of the delivery vehicle; and
the liftgate motor is secured onto the cargo compartment at a rear of the delivery vehicle.

23. The method of claim 22, wherein:
an electric motor is associated with the liftgate; and
sending a signal to operate the liftgate comprises sending an electrical signal from the capacitor module to the electric motor to cause the liftgate to be raised or to be lowered.

24. The method of claim 23, further comprising:
operating the delivery vehicle for a period of time to spin the alternator, thereby charging the first bank of capacitors within the capacitor module.

25. The method of claim 23, wherein:
the capacitor system further comprises an isolation switch residing between the first battery and the second capacitor bank, and a control button; and
the method further comprises pressing the control button, thereby closing the isolation switch to send charge from the first battery to the second capacitor bank.

26. The method of claim 23, wherein:
the capacitor module comprises a housing having three terminals; and
the first capacitor bank and the second capacitor bank reside together within the housing.

27. The method of claim 26, wherein:
the three terminals comprise a first positive terminal, a second positive terminal, and a negative terminal;
the first capacitor bank is in electrical communication with and is charged by the alternator through the first positive terminal; and
the second capacitor bank is in electrical communication with the liftgate motor through the second positive terminal.

28. The method of claim 27, wherein:
the second capacitor bank is charged by the first and second batteries through voltage equalization; and
when fully charged, the second capacitor bank contains enough energy to power the liftgate motor for the lift gate through at least two operating cycles without the first battery or the second battery.

29. The method of claim 27, further comprising:
an integrated DC/DC boost converter also residing within the housing of the capacitor module;
and wherein the DC/DC converter has an input side in electrical communication with the first capacitor bank, and an output side in electrical communication with the second capacitor bank.

30. The method of claim 29, wherein when the first capacitor bank is fully charged, the DC/DC converter transmits current from the first capacitor bank to the second capacitor bank to charge the second capacitor bank.

31. The method of claim 27, wherein:
the second capacitor bank provides power to a hotel load of the delivery vehicle through the second positive terminal.

32. The method of claim 27, wherein:
the first capacitor bank is in electrical communication with the alternator by means of an alternator cable connecting the alternator to the first positive terminal; and
the second capacitor bank is configured to support peak currents in the liftgate motor when the liftgate motor is in operation.

33. The method of claim 32, wherein:
each of the first capacitor bank and the second capacitor bank comprises 6 ultra-capacitors, providing two sets of six capacitors, in series; and
the first and second capacitor banks together yield a total capacitance of at least 1,000 Farads.

34. The method of claim 32, wherein:
when a voltage of the first capacitor bank is less than that of the second capacitor bank, power is supplied by the first battery and the second battery through the diode to the first capacitor bank.

* * * * *